United States Patent
Roth

[11] 3,762,287
[45] Oct. 2, 1973

[54] ARRANGEMENT FOR AUTOMATIC EXPOSURE CORRECTION UNDER HIGH CONTRAST LIGHTING CONDITIONS IN PHOTOGRAPHIC CAMERAS

[75] Inventor: Johann Roth, Schwabhausen, Germany

[73] Assignee: Braun Aktiengesellschaft, Frankfurt am Main, Germany

[22] Filed: Oct. 6, 1971

[21] Appl. No.: 187,046

[30] Foreign Application Priority Data
Oct. 10, 1970 Germany.................. P 20 49 800.4

[52] U.S. Cl............... 95/10 C, 95/10 CE, 95/64 D, 352/141, 356/226
[51] Int. Cl............................ G01j 1/44, G03b 7/08
[58] Field of Search........................ 95/10 C, 64 D; 352/141; 356/221, 225, 226; 317/123, 124

[56] References Cited
UNITED STATES PATENTS

| | | |
|---|---|---|
| 3,379,094 | 4/1968 | Bertram.............................. 356/226 |
| 3,383,566 | 5/1968 | Ciemniak et al..................... 352/141 |
| 3,618,488 | 11/1971 | Fauth et al........................... 95/10 C |
| 3,351,413 | 11/1967 | Seki Kono....................... 352/141 X |
| 3,394,642 | 7/1968 | Harou Teshi et al........... 352/141 X |
| 3,298,773 | 1/1967 | Auracher........................... 352/141 |
| 3,587,421 | 6/1971 | Shigeo Ono et al............ 95/64 D X |

Primary Examiner—Joseph F. Peters, Jr.
Attorney—Michael S. Striker

[57] ABSTRACT

A voltage-responsive diode or resistance is connected in parallel with the measuring instrument controlling the shutter opening in an automatic exposure arrangement. High voltage drops across the measuring instrument cause a low-parallel impedance, thereby decreasing the current through the measuring instrument, and thereby in turn correcting exposure errors resulting from the high-contrast lighting conditions.

7 Claims, 1 Drawing Figure

PATENTED OCT 2 1973　　3,762,287
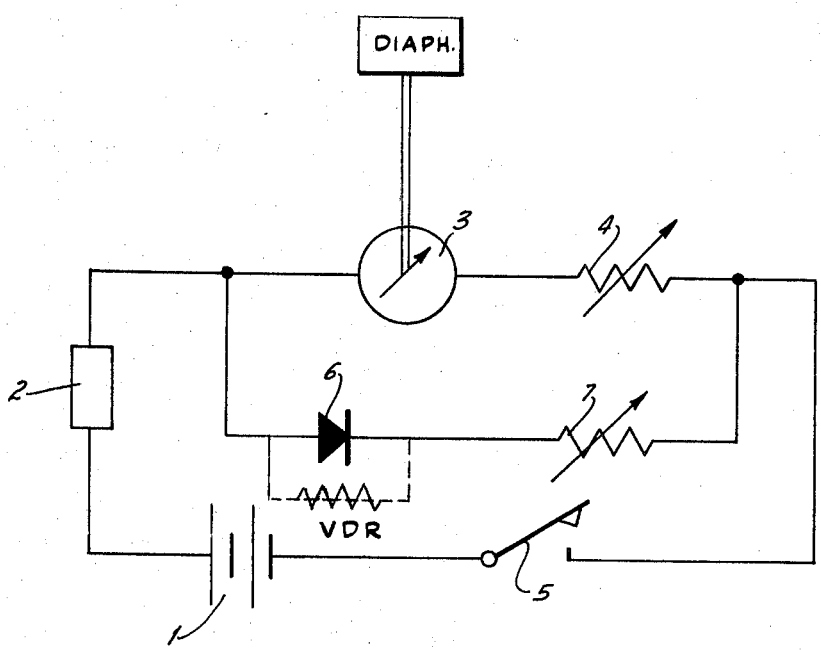
INVENTOR.
JOHANN ROTH
BY

3,762,287

ARRANGEMENT FOR AUTOMATIC EXPOSURE CORRECTION UNDER HIGH CONTRAST LIGHTING CONDITIONS IN PHOTOGRAPHIC CAMERAS

BACKGROUND OF THE INVENTION

This invention relates to photographic cameras having automatic exposure-control arrangements. It relates in particular to such automatic control arrangements wherein currentresponsive means, such as a measuring instrument, have a movable arm which deflects in correspondence to current flowing through the instrument. The movable arm is coupled to the shutter or diaphragm in such a manner that the deflection of the movable arm controls the opening of the shutter or diaphragm. Further, the measuring instrument is connected in series with a photoresistance. The photoresistance is mounted to receive light indicative of light illuminating the scene to be photographed and has a resistance which varies as a function of light impinging thereon. The current through the measuring instrument thereby varies as a function of the light in the scene to be photographed.

With such an automatic arrangement, good results are achieved when the illumination is within a "normal" range, that is when the gradation is within the contrast range of the film being used.

However, many conditions exist under which this requirement is not met. For example, it may be desired to photograph persons or objects in snow, at the beach, or in the mountains, or to take photographs against the sun. Under these conditions, it is necessary to correct the exposure value given by the automatic control arrangement in order to consider the fact that a great difference exists between the light emanating from the object to be photographed and the substantially lighter background, since the photoresistance will assume a resistance value corresponding to said much lighter background.

It is known that resistors may be connected in parallel with the measuring instrument under high-contrast lighting conditions thereby to compensate for exposure errors. The connection of a resistance in parallel with the measuring instrument decreases the current therethrough, thereby simulating a photoresistance corresponding to less light than actually exists. The shutter or diaphragm controlled by the measuring instrument therefore is opened wider, increasing the cross-sectional area of the light impinging on the film.

It is a disadvantage of the above-described arrangement that the corrective resistor must be inserted manually by the photographer. This can easily be forgotten. Not only that, but it is not always easy to recognize when such high-contrast conditions exist, since the human eye tends to accommodate rather rapidly to these conditions. Thus the user of the camera may not be aware of the fact that it is necessary to insert this corrective resistor.

Further, if the camera user does remember to insert the resistance and realizes the necessity therefor, the danger still exists that he will forget the so-inserted resistance when conditions change and it is no longer required. Thus any number of subsequent exposures, made during lighting conditions well within the contrast range of the film being used, may be ruined by over-exposure since the correcting resistor is still in the circuit.

SUMMARY OF THE INVENTION

It is an object of the present invention to furnish an automatic correction for the above-mentioned lighting conditions, thereby eliminating all operator error.

This invention is, therefore, an automatic exposure control arrangement in a photographic camera. It comprises a source of voltage. It further comprises photoresistance means mounted to receive light from the object or scene to be photographed and having a resistance varying as a function of light impinging thereon. The photoresistance means are connected to the source of voltage. Further connected to the photoresistance means and the source of voltage is a current-responsive means. The current-responsive means is adapted to vary the quantity of light impinging upon the film as a function of current flowing therethrough. Connected in parallel with the current-responsive means are voltage-responsive means which change the current flow through the current-responsive means as a function of the voltage across the current-responsive means, in such a manner as to compensate for exposure errors under high contrast conditions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a circuit diagram of an arrangement in accordance with the present invention.

DESCRIPTION OF THE PREFERRED EMBODIMENT

The preferred embodiment of the present invention will now be described with reference to the drawing.

In the present embodiment, the camera may be either a still or a movie camera. The automatic exposure control arrangement for this camera comprises a source of voltage, here a battery 1 which is series-connected with a photoresistance 2. Connected in series with photoresistance 2, is a measuring instrument 3 which has a moving arm, deflection of the moving arm controlling the opening of the diaphragm or shutter of the camera. Connected in series with the current-responsive means 3 is a second variable resistance 4 which serves to adjust the voltage drop across measuring instrument 3 and thus adjust the relative opening of the shutter corresponding to the current through the measuring instrument. Further connected in series with resistance 4, is a main switch 5. The above-described components are the standard components in a conventional automatic exposure control arrangement. Connected in parallel with the measuring instrument 3 and resistor 4, is the series combination of a diode 6 (one embodiment of voltage-responsive means) and a resistor 7 (one embodiment of first variable resistance means). The variable resistance 7 serves to control the voltage drop across diode 6 so that the diode operates along a characteristic line within a defined region, which characteristic line has of course to be matched to the characteristics of measuring instrument 3. Thus the degree of correction of the overall arrangement is determined by the value of resistance 7.

In the particular embodiment shown, the voltage-responsive means are embodied in a diode 6. An alternate embodiment would replace diode 6 with a voltage-dependent resistor, indicated by VDR and having a dashed-line connection to indicate that it constitutes an alternate embodiment. Until the voltage drop across elements 3 and 4 exceeds 0.5 volts, the resistance of the diodes is sufficiently high that almost the whole current from the battery flows through measuring instrument 3, so that the deflection of the measuring instrument corresponds to the quantity of light impinging upon the photoresistance 2. This is the situation under lighting conditions of low or medium intensity.

If however light of high intensity impinges upon photoresistance 2, the voltage drop across the measuring instrument increases to 0.6 volts or higher. This exceeds the threshold value of diode 6, causing its resistance to decrease rapidly. This in turn causes a substantial part of the current to be diverted through the shunt path comprising elements 6 and 7, rather than through the measuring instrument 3 and resistance 4. This causes the meter deflection, to vary in a direction causing increased opening of the diaphragm, which is positioned in the path of light to the film, thereby causing the desired compensation.

Of course a voltage-dependent resistance or other suitable circuit elements may be used to replace diode 6. In the sense of the present invention, it is only important that the element connected in shunt with the measuring instrument has a resistance which varies as a function of the voltage across the measuring instrument.

Of course resistance 4 may be omitted if the adjustment between the voltage drop across measuring instrument 3 and the corresponding shutter opening is made by changing the winding resistance of the measuring instrument.

While the invention has been illustrated and described as embodied in a shunt circuit using a diode, it is not intended to be limited to the details shown, since various modifications, structural and circuit changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be protected by Letters Patent is set forth in the appended claims.

1. In a photographic camera having film, in combination, a source of voltage; photoresistance means having a resistance varying as a function of light impinging thereon, mounted to receive light indicative of light illuminating the scene to be photographed, and connected to said source of voltage; current responsive means connected to said photoresistance means and said source of voltage, for varying the quantity of light impinging on said film as a function of current flowing therethrough; and voltage responsive correction means connected in parallel with said current responsive means, said voltage responsive correction means having characteristics which cause substantially all the current from the battery to flow through said current responsive means and substantially no current to flow through said voltage responsive correction means until the voltage across said current responsive means exceeds a predetermined voltage and causes a substantial part of the current from said source of voltage to flow through said voltage responsive correction means and a substantially reduced current to flow through said current responsive means when the voltage across said current responsive means exceeds said predetermined voltage and wherein the current flowing through said current responsive means is decreased by said voltage dependent correction means under high intensity light conditions.

2. An arrangement as set forth in claim 1, wherein said source of voltage is a source of D.C. voltage; and wherein said voltage-responsive correction means comprise diode means connected with forward polarity across said current-responsive means.

3. An arrangement as set forth in claim 2, wherein said diode means comprise a silicon diode.

4. An arrangement as set forth in claim 1, wherein said voltage-responsive correction means comprise a voltage-responsive resistor.

5. An arrangement as set forth in claim 1, further comprising first variable resistance means connected in series with said voltage-responsive correction means.

6. An arrangement as set forth in claim 1, wherein said camera has a diaphragm; and wherein said current-responsive means comprise measuring means having a movable arm deflecting in response to current through said measuring means; and means connecting said movable arm and said diaphragm in such a manner that the opening of said diaphragm is a function of the deflection of said movable arm.

7. An arrangement as set forth in claim 1, further comprising second variable resistance means connected in series with said current-responsive means.

* * * * *